United States Patent [19]

Wesley

[11] 4,385,451

[45] May 31, 1983

[54] CONTROL DEVICE FOR LAUNDRY DRIER

[75] Inventor: Victor J. Wesley, London, England

[73] Assignee: U.S. Philips Corporation, New York, N.Y.

[21] Appl. No.: 227,834

[22] Filed: Jan. 23, 1981

[30] Foreign Application Priority Data

Jan. 28, 1980 [GB] United Kingdom ................. 8002783

[51] Int. Cl.³ ............................................. F26B 21/06
[52] U.S. Cl. ........................................... 34/53; 34/55; 34/133
[58] Field of Search ......................... 34/48, 53, 55, 133

[56] References Cited

U.S. PATENT DOCUMENTS

| | | | |
|---|---|---|---|
| 3,324,568 | 6/1967 | Nelson et al. | 34/45 |
| 3,497,964 | 3/1970 | Elders | 34/53 |
| 3,758,959 | 9/1973 | Karklys | 34/48 |

Primary Examiner—Larry I. Schwartz
Attorney, Agent, or Firm—Bernard Franzblau; Robert T. Mayer

[57] ABSTRACT

A control device for a laundry drier in which tumbling of the load articles causes them to form intermittent connections between contact electrodes. The control device is responsive to the state of dryness of the load includes means for causing an electrical current flow through a resistor, the electrodes and the load articles such that a potential difference is developed across the resistor. This potential difference is applied to a comparator for comparison with a reference potential value. A resettable timing circuit is reset to the beginning of a fixed time interval whenever the detected potential difference exceeds the reference value and the timing circuit operates an output switch only if no resetting action has occurred in that time interval.

12 Claims, 4 Drawing Figures

CONTROL DEVICE FOR LAUNDRY DRIER

This invention relates to a control device for a laundry drier of the kind in which a mechanical movement of the washing load permits the articles of the load at least intermittently to form an electrically resistive bridge between contact electrodes. The control device is responsive to the degree of dryness of the washing load.

One device of the abovementioned kind has been disclosed in United Kingdom Pat. No. 1,241,879. This patented device measures the dryness of the washing load by a method in which an intermittent potential difference between the contact electrodes is applied to a storage element for enabling the potential difference to be stored. In the embodiments described, the storage element is a capacitor which is charged quickly to a particular potential (and is subsequently discharged slowly) by the intermittent contacts taking place as the articles of the washing load bridge the contact electrodes. The varying potential across the capacitor is integrated by a long time constant (several seconds) arrangement to provide a mean potential. When the washing load becomes dry, the electrical resistance of the articles reaches a maximum value and the said mean potential correspondingly reaches a predetermined voltage level. The occurrence of this voltage level is detected by a cold cathode tube and ignition of this tube is used to energise an electromagnetic relay. The relay controls a heater or a programme switching mechanism of the drier.

The characteristic of the washing load detected by the patented device is the mean dryness, since the electrical resistance of the load corresponds to the total amount of water distributed throughout all the articles forming the load. However, since an average washing load contains thick articles such as towels possibly combined with articles of thin synthetic fabrics, the load as a whole is likely to dry unevenly. Thus the load taken as a whole can be found to be dry according to a mean dryness measurement but the water remaining in the load will be concentrated in the folds and seamed edges of the heavier materials and these portions can still be wet. Since the device only responds to the mean dryness (by integrating the detected dryness signals with respect to time), occasional damp patches in the washing load will not be detected if they produce only sporadic "still wet" (i.e. low resistance) signals. For this reason, it may be necessary for a user of the laundry drier to interrupt operation of the machine and examine the drying articles in order to detect whether the heavier materials have become sufficiently free of water for the drying operation to be considered complete.

It would avoid the need for the drier operation to be closely supervised if the control device were capable of detecting the presence of still wet portions of the load. The present invention provides a control device that is capable of detecting the presence in any part of a washing load of an area where the state of dryness has not reached a predetermined reference level.

According to the invention, there is provided a control device for a laundry drier of the kind in which a mechanical movement of the load to be dried permits at least some of the articles of the load to form, at least intermittently, an electrically resistive connection between contact electrodes. The control device is responsive to the state of dryness of the load and the device includes means for causing an electrical current flow through a resistive element and, via said electrodes, through said articles such that a potential difference is developed across the resistive element. The invention is characterised in that the device further includes a comparator for comparing said potential difference with a reference potential value, a resettable timing circuit arranged to be reset to the beginning of a predetermined time interval whenever the said potential difference exceeds said reference potential value, and an output switch which is operated by said timing circuit at the end of a said time interval only if no such resetting action has occurred during that time interval. A further characteristic feature of the invention is the provision of an AC current flow in said resistive element and between said electrodes which is derived from a low voltage secondary winding of an isolating transformer.

Thus, the time interval is initiated by the timing circuit when the required dryness level is reached and the output switch is operated by the timing circuit at the end of the time interval. If, however, the potential difference equals or exceeds the reference voltage during this interval—that is to say a damp patch is momentarily detected in the washing load—then the timing circuit is reset and the time interval is initiated afresh. Thus the output switch cannot be operated until such time as no damp patches are detected in a period equal to the time interval, e.g., 45 seconds.

Preferably, the timing circuit includes a capacitor connected to be charged from a source of constant voltage. A semiconductor device may be arranged for rapidly discharging said capacitor if the comparator detects a potential difference which equals or exceeds the reference potential value.

The output switch may comprise a latching output driver circuit such as a Schmitt trigger circuit or the circuit described.

Advantageously, the said electrical current flow between the electrodes is an alternating current. In the device of the invention, a direct current across the electrodes is not excluded but the use of alternating current enables certain problems, such as the occurrence of electrolytic action or contamination of the surfaces of the contact electrodes, to be reduced.

By way of example, particular embodiments of the invention will now be described with reference to the accompanying drawings, in which.

Figure 1:
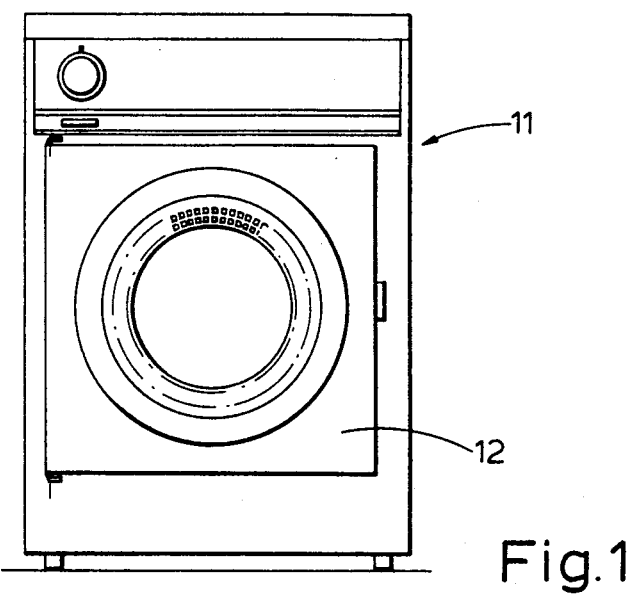
FIG. 1 shows a laundry drier including the control device of the invention.

FIG. 1 depicts a laundry drier 11 of the kind in which the articles of a load to be dried are placed in a rotatable drum which is located behind a door 12. In operation, heated air is passed through the drum as it rotates and the damp articles are thus tumbled slowly in the warm air stream. The internal surface of the drum carries electrical contact electrodes (not shown) and these are intermittently bridged by the washing articles as they are tumbled in the drum. By measurement of the electrical resistance between the electrodes and through the articles the progress of the drying operation can be measured. At a suitable point in the drying operation it is possible to switch off the drier or to switch a programme timer of the drier to a different programme stage, such as a cooling-off period, where the heated air flow is replaced by a cold air flow. The control device of the invention enables the progress of the drying operation to be monitored.

The circuit is designed to detect operator-programmed dryness levels. This is achieved by obtaining a signal voltage from a potential divider formed by the electrical resistance of damp fabrics and a scaling resistor and by comparing this voltage with a fixed reference potential. The value of the scaling resistor may be varied to give different dryness levels. An electronic latch is used to operate a relay when the selected dryness level has been detected and hence, for example, terminate the drying period.

Figure 2:
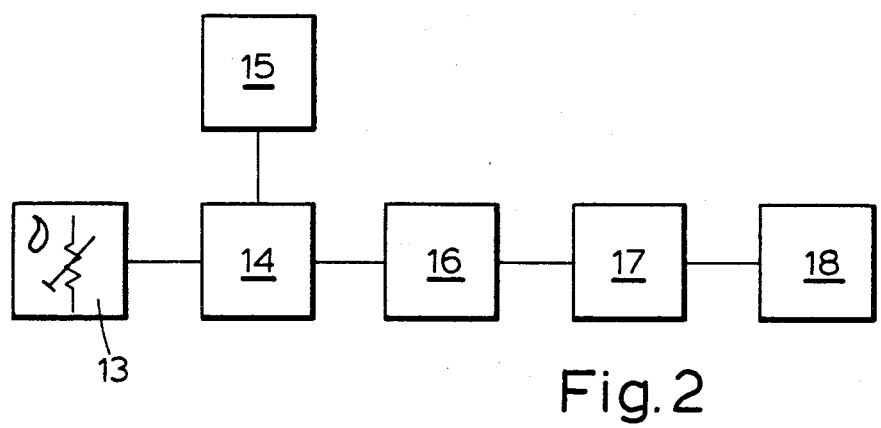
FIG. 2 is a block diagram illustrating the principle of the control device.

A block diagram of the control device is given in FIG. 2. In this Figure, the electrical resistance of the washing articles is represented as a moisture-sensitive resistor 13.

The type of power supply used in combination with the circuit's ability to compare a peak voltage with a reference potential enables the sensitising voltage across the fabrics and (more important) across the drum probes to be either an alternating current or a direct current. An alternating current is to be preferred in any process where electrochemical effects such as corrosion or the presence of electrically insulating anodic deposits could result from using direct current. Alternating current is also preferred where problems could be caused by an insulating deposit on the electrodes if direct current were used. The deposit would act as a dielectric and would cause gross measurement inaccuracies.

The circuit is designed to respond to damp fabrics falling across sensing probes in a random manner. These may make contact for only a very short time (e.g. one tenth of a second); so it is necessary for the circuit to be able to respond immediately to such contacts. Another characteristic of the random tumbling action is that there may be significantly long periods between contacts with the fabrics so it is necessary to allow a period after each contact before allowing the circuit to respond with a 'dry' signal. This period is gauged as a compromise between the shortest time sufficient to ensure that all wet patches within the wash load have fallen across the sensing probes and the longest time allowable to ensure that further drying time is not significant before switch-off occurs.

It is important that once detection of the selected dryness level has occurred, then only the normal setting means, that is the removal and reapplication of the AC supply power by the user, is capable of resetting the circuit. A bistable latch is used to ensure a stable "off" condition of the circuit whereby the circuit will no longer respond to any signal at its input terminals.

In FIG. 2, a voltage developed across the resistor 13 forms one input to a comparator 14 and a reference voltage source 15 forms a second input. The comparator 14 is arranged to produce an output whenever the voltage representative of the state of dryness of the washing load equals or exceeds the predetermined reference voltage. An output from the comparator 14 is fed to a sample timing circuit 16 which controls the operation of an output switch 17. The sample timing circuit prevents the output switch 17 from operating until a washing article voltage having a value below the predetermined reference voltage level exists for a predetermined time interval. The sample timing circuit 16 thus prevents the output switch 17 from being operated while low resistance washing article contacts are being detected. When the first high resistance contacts are detected, the sample timing circuit will continue to be reset to the start of a new timing period by the recurrence of low resistance contacts. Eventually a time period up to about a minute will have elapsed without any low resistance contacts being detected, and the sample timing circuit 16 will then operate the output switch 17. The output switch 17 is connected to a programme timer 18 of the drier.

Figure 3:
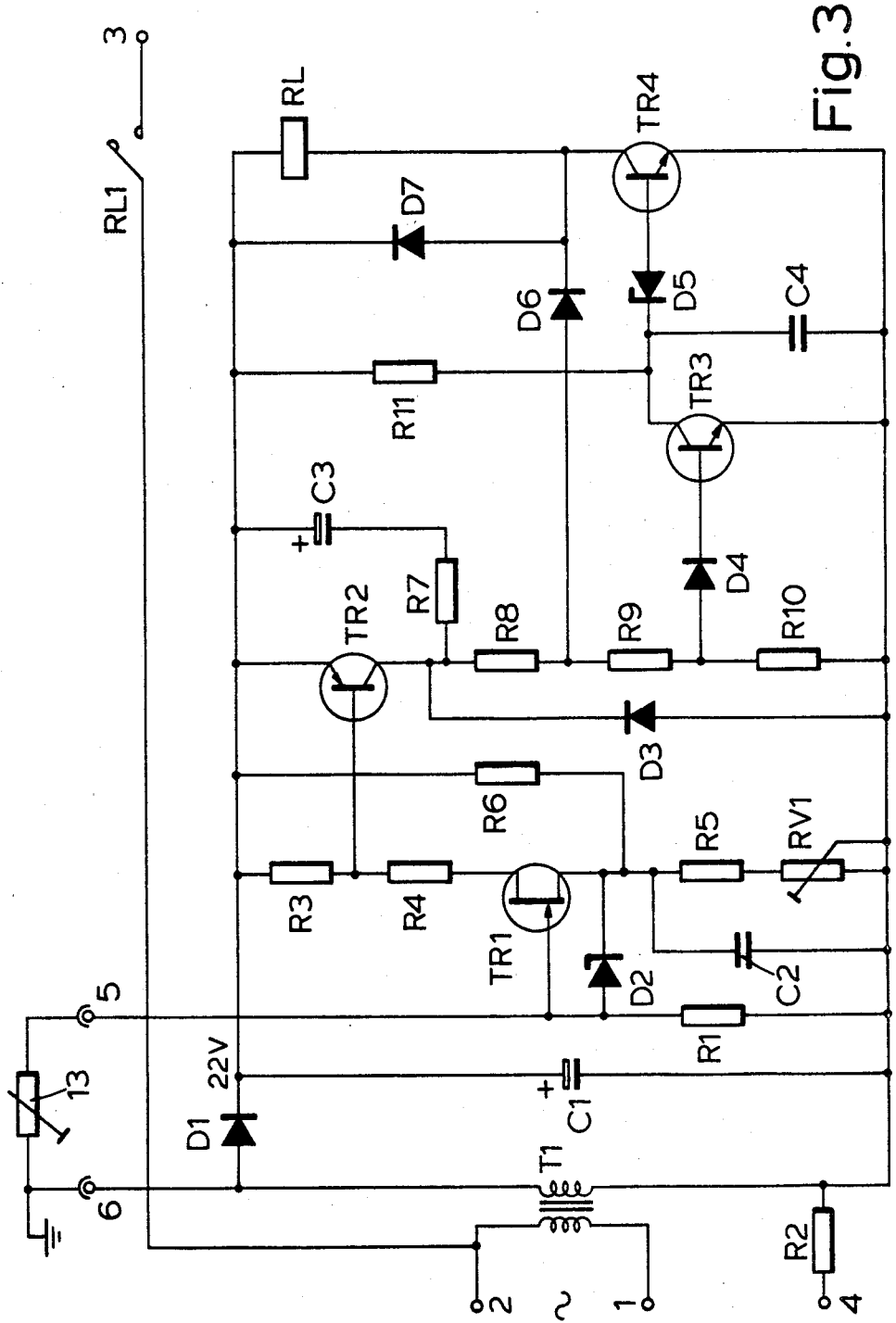
FIG. 3 is a circuit diagram of the control device.

A practical embodiment of the control device is depicted in the circuit diagram of FIG. 3. The circuit is powered from A.C. power supply which is applied to the primary terminals of a transformer T1 which both steps down the AC supply potential to the required voltage, and provides electrical isolation from the power supply which can allow the secondary circuit to be grounded, if necessary.

A diode D1 rectifies the secondary A.C. and a capacitor C1 smooths the D.C. potential required to power the circuit. The value of capacitor C1 is large enough to give adequate smoothing of the ripple during operation, but small enough to discharge and hence allow the circuit to reset within a few seconds following switch-off of the AC supply. In the tumble drier, the transformer secondary terminal 6 forms one sensing probe while terminal 5, the other sensing probe, is connected in series with a resistor R1 in order to form a potential divider with the resistance 13 of the damp fabrics of the load. The midpoint of this divider is connected to the gate terminal of a field effect transistor TR1. In this embodiment, use of a junction gate field effect transistor, preferably an N-channel-junction FET, was selected because its high gate impedance is unlikely to influence the potential at the divider midpoint whereas the base current of a normal bi-polar device might. Resistor R2 is provided so that a switch (not shown) between terminals 4 and 5 may connect it in parallel with resistor R1 to allow the drying to be terminated at a different wash resistance. Transistor TR1 is used in this circuit in order to compare the peak potential across the wash load with a set reference potential at its source terminal. This reference potential is established by the potential dividing action of resistor R6 with resistors R5 and RV1, the transistor being decoupled by capacitor C2. The prior adjustment of resistor RV1 takes account of circuit variables such as gate-source characteristics and resistor tolerances. Zener diode D2 provides protection for transistor TR1 against any excessive negative voltage excursion at its gate terminal.

A positive peak potential greater than the reference potential will cause transistor TR1 to conduct, thus drawing base current from transistor TR2 via resistor R4 causing transistor TR2 also to conduct (resistor R3 acts to guard against the possibility of undesired leakage paths causing transistor TR2 to conduct). The conduction of transistor TR2 causes timing capacitor C3 (previously charged as described below) to discharge rapidly via resistor R7, thus resetting the sampling period.

The sampling period is achieved by capacitor C3 charging via resistors R7, R8 and R9 into the base electrode of transistor TR3 via diode D4. Thus so long as the capacitor C3 charging current is sufficient to keep transistor TR3 conducting, transistor TR4 will be starved of base current since zener diode D5 is prevented from conducting. As capacitor C3 charges, the current through resistors R7, R8 and R9 will decrease with an exponential decay until the current into the base electrode of transistor TR3 is no longer sufficient to keep transistor TR3 in conduction and its collector electrode voltage will rise due to the presence of resistor R11. When the voltage at the transistor TR3 collector electrode is greater than the zener voltage of diode D5 (e.g. 13 volts), base current will flow into transistor TR4 causing it to conduct and, in turn, to energise the coil of relay RL causing the associated relay contacts RL1 to close.

Latching action of the circuit is provided by feedback from transistor TR4 via diode D6 to the junction of resistors R8 and R9 such that when transistor TR4 is conducting the voltage difference between the junction of resistors R8 and R9 and zero volts is never greater than the inherent saturation voltage of transistor TR4 plus the forward voltage drop of diode D6. This, when divided by the action of resistors R9 and R10 and further "dropped" by diode D4, ensures that transistor TR3 is held out of conduction.

In addition to providing for the actual functioning of the circuit, certain other requirements have been considered. For example, after the circuit has sensed a dry washing load and has then it is necessary that been switched off by the operator, then within a few seconds the circuit will re-establish its quiescent "sensing state" once power is re-applied. To this end (as already mentioned) the value of capacitor C1 is made as low as possible and diode D3 is included in order to discharge capacitor C3 quickly after switch-off.

To ensure that the circuit can establish itself in the correct state at "switch-on", zener diode D5 is dimensioned so as to allow transistor TR3 to turn-on before transistor TR4.

Figure 4:
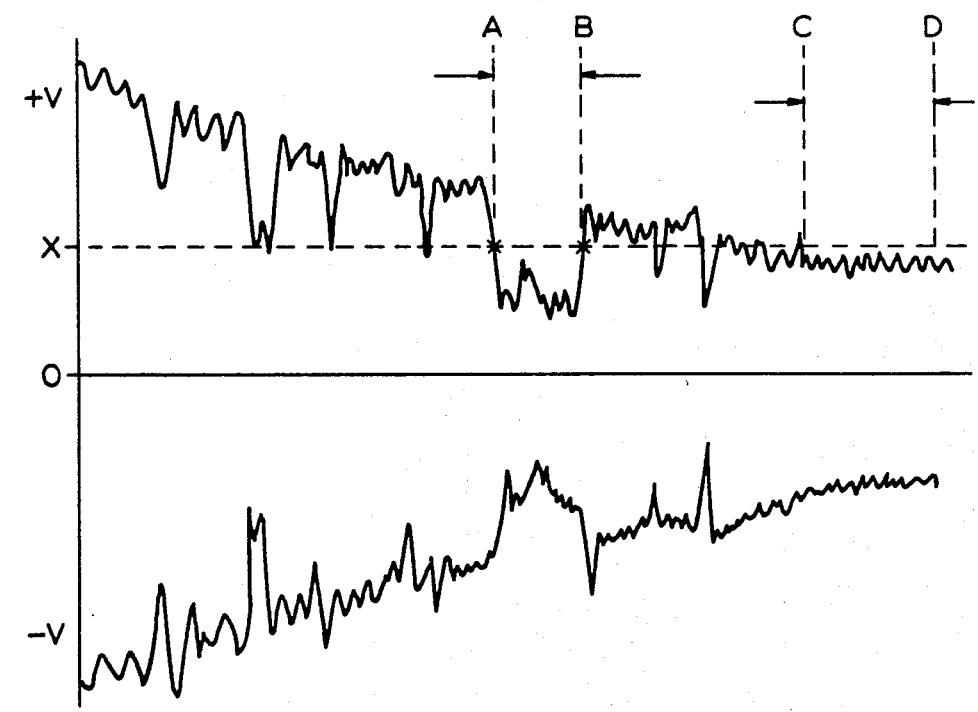
FIG. 4 is a graph of a waveform appearing during operation of the circuit.

FIG. 4 shows on a vertical axis the "envelope" of the peak A.C. voltage waveform V that may appear across the scaling resistor R1 towards the end of a drying operation. The use of a D.C. sensing voltage which might occur in a different embodiment of the present circuits could be represented by the positive part of the curve alone.

At instant A the voltage falls below the preset reference potential value X, and remains low until instant B, say 40 seconds later. This period is less than the chosen sampling period (say 45 seconds) and capacitor C3 is discharged, thus resetting the timing circuit. The drying operation is allowed to continue until instant C, where once again the level falls below the reference potential, but now remains low for longer than 45 seconds and at instant D, the end of the 45 seconds timing period, the drying process is terminated.

In operation, the resistor R1, together with whatever resistance value appears when the contact terminals in the drum are bridged across by the articles, acts as a first potential divider and a voltage proportional to the electrical resistance of the washing articles is applied to the gate electrode of the field effect transistor TR1.

The source electrode of the transistor TR1 has a predetermined reference voltage applied to it from a second potential divider comprising the resistors R6, R5 and RV1. This second potential divider is supplied with a direct potential (22 volts) across its ends from a D.C. power supply comprising the diode D1 acting as a half-wave rectifier and the smoothing capacitor C1.

A rise of potential across the plates of capacitor C3 causes operation of an output switch. In the present embodiment, this output switch comprises transistors TR3, TR4 and an electromagnetic relay RL. Transistors TR3 and TR4 are connected together in a manner somewhat analogous to that of a Schmitt trigger circuit so that a potential below a predetermined level on the base electrode of transistor TR3 will cause the connection between the emitter and collector electrodes of transistor TR4 to become conductive and the relay RL will be energised. When the voltage on the base of transistor TR3 is above the predetermined level, the relay RL will not be energised.

When the capacitor C3 is allowed to become fully charged, the base electrode of transistor TR3 becomes starved of base current and transistor TR4 is turned on. The relay RL is thus energised and an associated relay contact RL1 is moved to a MAKE condition causing an output terminal 3 to be coupled to the AC supply potential.

The purpose of the diode D6 is to provide feedback to ensure correct operation of the transistors TR3 and TR4.

The foregoing description of an embodiment of the invention has been given by way of example only and a number of modifications may be made without departing from the scope of the invention as defined in the appended claims. For instance, it is not essential that the current flow applied through the washing articles be an alternating current. In a different embodiment the flow could be a direct current. It is also not essential that the sample timing period be provided by a resistor-capacitor combination. In an alternative embodiment the sample timing may be achieved by digital circuit means, for example. The circuit described is for a control device intended to energise a small synchronous motor of a tumble drier programme timer when the correct dryness level has been reached. In an alternative construction, the circuit could be arranged to switch the whole drier off upon detection of the selected dryness level. Such an arrangement may remove the need for the circuit output to be latched since removal of the AC supply would prevent further operation of the circuit.

I claim:

1. A control device for a laundry drier of the kind in which a mechanical movement of the load to be dried permits at least some articles of the load to form, at least intermittently, an electrically resistive connection between contact electrodes, the control device being responsive to the state of dryness of the load, the improvement therein comprising, means for causing an electrical current flow through a resistive element and, via said contact electrodes, through said load articles such that a potential difference is developed across the resistive element which is a continuous function of the state of dryness of said load, a comparator for comparing said potential difference with a reference potential value, means coupling first and second imputs of said comparator to said resistive element and to a source of said reference potential, means coupling an output of the comparator to a resettable timing circuit having a predetermined time interval and arranged to be reset to the beginning of said predetermined time interval whenever the detected potential difference exceeds said reference potential value, and an output switch operated by said timing circuit at the end of a said time interval only if a resetting action has not occurred during said predetermined time interval.

2. A device as claimed in claim 1, wherein the timing circuit includes a time constant circuit having a capacitor connected to be charged from a source of constant voltage.

3. A device as claimed in claim 1, wherein the timing circuit includes a capacitor connected to be charged from a source of constant current.

4. A device as claimed in claim 2 further comprising a semiconductor device arranged to rapidly discharge said capacitor if the comparator detects a potential difference which exceeds the reference potential value.

5. A device as claimed in any one of claims 1 to 4, wherein the output switch comprises a latching output driver circuit and an electromagnetic relay driven thereby.

6. A device as claimed in claim 5, wherein the latching output driver circuit comprises a Schmitt trigger circuit.

7. A device as claimed in claim 1 wherein said means for causing an electrical current flow comprises a step-down transformer having a primary winding coupled to a source of AC voltage and a secondary winding coupled to the contact electrodes and the resistive element to provide an AC current flow therein.

8. A drying control device for a laundry drier which includes a pair of spaced apart contact electrodes adapted to contact, at least intermittently, the load fabrics so as to sense the degree of dryness thereof, the drying control device comprising:
a source of AC current,
a resistor,
means for coupling said contact electrodes and said resistor to said AC current source so that an AC current flows through the load fabrics via said contact electrodes so as to develop a potential difference across the resistor that is determined by the degree of dryness of the load fabrics,
a comparator having first and second inputs coupled to said resistor and to a source of reference voltage, respectively,
a resettable timing circuit having a fixed operating time interval,
means coupling the timing circuit to an output of the comparator so that the timing circuit is reset to the start of said time interval whenever said potential difference achieves a given relationship to said reference voltage, and
an output switch operated by said timing circuit at the end of said fixed time interval provided that a reset action does not occur during a said fixed time interval.

9. In a laundry drier of the type including a receptacle for the load to be dried which includes spaced apart contact electrodes adapted to form, at least intermittently, an electrically resistive connection therebetween as a result of mechanical movement of the load articles in the receptacle, the improvement therein of a control device responsive to a state of dryness of the load articles comprising:
a source of alternating current, a resistive element, means for coupling said contact electrodes and said resistive element to said alternating current source so that an alternating current flows through the resistive element and via said contact electrodes through said load articles so that a potential difference is developed across the resistive element, a comparator coupled to said resistive element and to a source of reference voltage for comparing said potential difference with said reference voltage, a resettable timing circuit having a predetermined operating time interval and coupled to an output of the comparator and arranged to be reset to the start of said predetermined time interval whenever said potential difference exceeds said reference voltage, and an output switch coupled to said timing circuit and operated thereby at the end of a said predetermined time interval only if a reset action does not occur during said predetermined time interval.

10. A control device as claimed in claim 9 wherein the timing circuit comprises a resistance-capacitance circuit including a capacitor coupled to a source of DC voltage and a semiconductor switch coupled to the capacitor to provide a discharge path therefor and responsive to the output of the comparator to discharge the capacitor whenever said contact electrodes contact a moist load article within said predetermined time interval thereby to reset the timing circuit to the start of a further said predetermined time interval.

11. A control device as claimed in claim 10 wherein the output switch comprises first and second switching transistors each having a control electrode and an output electrode, means coupling the control electrode of the first transistor to the charge circuit of said capacitor so as to control the conductive state of said first transistor, means coupling the output electrode of the first transistor to the control electrode of the second transistor so that conduction of the first transistor controls the second transistor into cut-off, and a feedback circuit coupling the output electrode of the second transistor to the control electrode of the first transistor so that conduction of the second transistor latches the first transistor into a cut-off state.

12. A device as claimed in any one of claims 1 to 4 wherein the comparator comprises a junction gate field effect transistor.

* * * * *

UNITED STATES PATENT AND TRADEMARK OFFICE
CERTIFICATE OF CORRECTION

PATENT NO. : 4,385,451
DATED : May 31, 1983
INVENTOR(S) : VICTOR J. WESLEY

It is certified that error appears in the above-identified patent and that said Letters Patent is hereby corrected as shown below:

In the Abstract:

Line 4, after "load" insert --and--

Claim 12, line 1, change "4" to --3--

Signed and Sealed this

Twenty-fourth Day of September 1985

[SEAL]

Attest:

DONALD J. QUIGG

Attesting Officer

*Commissioner of Patents and Trademarks—Designate*